(12) United States Patent  (10) Patent No.: US 11,040,289 B2
Lochtefeld  (45) Date of Patent: Jun. 22, 2021

(54) PADDED GRATE DRAINAGE SYSTEM FOR WATER RIDES

(71) Applicant: Thomas J. Lochtefeld, La Jolla, CA (US)

(72) Inventor: Thomas J. Lochtefeld, La Jolla, CA (US)

(73) Assignee: WhiteWater West Industries, LTD., British Columbia (CA)

( * ) Notice: Subject to any disclaimer, the term of this patent is extended or adjusted under 35 U.S.C. 154(b) by 0 days.

(21) Appl. No.: 15/987,718

(22) Filed: May 23, 2018

(65) Prior Publication Data
US 2018/0264368 A1  Sep. 20, 2018

Related U.S. Application Data

(63) Continuation of application No. 15/413,245, filed on Jan. 23, 2017, now Pat. No. 10,105,611, which is a (Continued)

(51) Int. Cl.
*A63G 21/18* (2006.01)
*A63G 31/00* (2006.01)
(Continued)

(52) U.S. Cl.
CPC ........... *A63G 31/007* (2013.01); *A63G 21/18* (2013.01); *B01D 29/445* (2013.01); *A47K 3/00* (2013.01)

(58) Field of Classification Search
CPC ...... A63G 31/00; A63G 31/007; A63G 21/00; A63G 21/18; B01D 29/00; B01D 29/445;
(Continued)

(56) References Cited

U.S. PATENT DOCUMENTS

| 435,227 A | 8/1890 | Inglis |
| 490,484 A | 1/1893 | Mackaye |

(Continued)

FOREIGN PATENT DOCUMENTS

| AU | 2007201135 | 4/2007 |
| BR | PI0721429-4 | 3/2014 |

(Continued)

OTHER PUBLICATIONS

PCT/US2014/031322 International Search Report and Written Opinion, dated Aug. 20, 2014.

*Primary Examiner* — Kien T Nguyen
(74) *Attorney, Agent, or Firm* — Buchalter, a professional corp.; Kari L. Barnes

(57) ABSTRACT

A padded grating system comprising sheets of multiple composite members secured together with multiple support bars or battens, wherein each composite member preferably consists of an elongated rigid bar with a foam layer adhered thereto which are encapsulated by a PVC or plastic water impervious tube or sleeve that has been heated and shrunk thereon. The sheets are specifically designed to be used in connection with water rides such as the FlowRider® and can be modularly installed on site to cover certain drainage areas. The composite members are preferably made by gluing the rigid bars onto a sheet of foam and cutting the foam sheet to form the composite members, and after the tube or sleeve has been heat shrunk around each one, the ends of the composite members are then cut and sealed.

20 Claims, 14 Drawing Sheets

Related U.S. Application Data continuation of application No. 14/220,577, filed on Mar. 20, 2014, now Pat. No. 9,550,127.

(60) Provisional application No. 61/804,038, filed on Mar. 21, 2013.

(51) Int. Cl.
  *B01D 29/44* (2006.01)
  *A47K 3/00* (2006.01)

(58) Field of Classification Search
  CPC . A47K 3/00; C08L 75/00; C08L 75/04; C08L 63/00
  USPC ............... 472/117, 128; 4/488–513; 264/239
  See application file for complete search history.

(56) References Cited

U.S. PATENT DOCUMENTS

| | | |
|---|---|---|
| 586,718 A | 7/1897 | Wharton, Jr. |
| 586,983 A | 7/1897 | Wharton, Jr. |
| 654,980 A | 7/1900 | Howard |
| 799,708 A | 9/1905 | Boyce |
| 1,392,533 A | 10/1921 | Smyth |
| 1,693,459 A | 3/1925 | Paulus |
| 1,536,875 A | 5/1925 | Bowen |
| 1,655,498 A | 1/1928 | Fisch |
| 1,701,842 A | 2/1928 | Fisch |
| 1,871,215 A | 8/1932 | Keller |
| 1,884,075 A | 10/1932 | Meyers |
| 2,117,982 A | 5/1938 | Prince, Jr. |
| 2,558,759 A * | 7/1951 | Johnson .................. E01C 13/12 |
| | | 472/90 |
| 2,815,951 A | 12/1957 | Baldanza |
| 3,005,207 A | 10/1961 | Matrai |
| 3,038,760 A | 6/1962 | Crooke |
| 3,085,404 A | 4/1963 | Smith |
| 3,120,385 A | 2/1964 | Hall |
| 3,216,455 A | 11/1965 | Cornell |
| 3,363,583 A | 1/1968 | Greenberg |
| 3,473,334 A | 10/1969 | Dexter |
| 3,477,233 A | 11/1969 | Andersen |
| 3,478,444 A | 11/1969 | Presnell |
| 3,497,211 A | 2/1970 | Nagin |
| 3,523,307 A | 8/1970 | Buswell |
| 3,547,749 A | 12/1970 | White |
| 3,557,559 A | 1/1971 | Barr |
| 3,562,823 A | 2/1971 | Koster |
| 3,565,491 A | 2/1971 | Frazier |
| 3,578,810 A | 5/1971 | Newstead |
| 3,598,402 A | 8/1971 | Frenzl |
| 3,611,727 A | 10/1971 | Blandford |
| 3,613,377 A | 10/1971 | Zaugg |
| 3,757,370 A | 9/1973 | Seno |
| 3,789,612 A | 2/1974 | Richard |
| 3,802,697 A | 4/1974 | Le Mehaute |
| 3,845,510 A | 11/1974 | Baker |
| 3,850,373 A | 11/1974 | Grolitsch |
| 3,851,476 A | 12/1974 | Edwards |
| 3,853,067 A | 12/1974 | Bacon |
| 3,913,332 A | 10/1975 | Forsman |
| 3,981,612 A | 9/1976 | Bunger |
| 4,062,192 A | 12/1977 | Biewer |
| 4,087,088 A * | 5/1978 | Kelso ..................... A63B 69/18 |
| | | 198/321 |
| 4,122,560 A | 10/1978 | Baker |
| 4,147,844 A | 4/1979 | Babinky et al. |
| 4,149,710 A | 4/1979 | Rouchard |
| 4,196,900 A | 4/1980 | Becker |
| 4,197,815 A | 4/1980 | Brazelton |
| 4,198,043 A | 4/1980 | Timbes |
| 4,201,496 A | 5/1980 | Andersen |
| 4,244,768 A * | 1/1981 | Wiechowski ........... E04C 2/425 |
| | | 156/279 |
| 4,246,980 A | 1/1981 | Miller |
| 4,276,664 A | 7/1981 | Baker |
| 4,278,247 A | 7/1981 | Joppe |
| 4,339,122 A * | 7/1982 | Croul ..................... A63G 21/18 |
| | | 104/70 |
| 4,374,169 A * | 2/1983 | Gryskiewicz ........... E04C 2/422 |
| | | 209/392 |
| 4,429,867 A | 2/1984 | Barber |
| 4,474,369 A | 10/1984 | Gordon |
| 4,522,535 A | 6/1985 | Bastenhof |
| 4,539,719 A | 9/1985 | Schuster |
| 4,557,475 A * | 12/1985 | Donovan ................ A63C 19/04 |
| | | 267/152 |
| 4,561,133 A | 12/1985 | Laing |
| 4,564,190 A | 1/1986 | Frenzl |
| 4,574,107 A | 3/1986 | Ferrari |
| 4,662,781 A | 5/1987 | Tinkler |
| 4,707,869 A | 11/1987 | Ray |
| 4,736,912 A | 4/1988 | Loebert |
| 4,790,155 A | 12/1988 | Daniel |
| 4,790,685 A | 12/1988 | Scott |
| 4,792,260 A | 12/1988 | Sauerbier |
| 4,805,897 A | 2/1989 | Dubeta |
| 4,806,048 A | 2/1989 | Ito |
| 4,836,521 A | 6/1989 | Barber |
| 4,895,875 A | 1/1990 | Winston |
| 4,903,959 A | 2/1990 | Barber |
| 4,905,987 A | 3/1990 | Frenzl |
| 4,954,014 A | 9/1990 | Sauerbier |
| 4,976,422 A | 12/1990 | Shimamura |
| 4,988,364 A | 1/1991 | Perusich et al. |
| 5,005,762 A | 4/1991 | Cacoub |
| 5,020,465 A | 6/1991 | Langford |
| 5,061,211 A | 10/1991 | Barber |
| 5,125,577 A | 6/1992 | Frankel |
| 5,170,901 A | 12/1992 | Bersani |
| 5,171,101 A | 12/1992 | Sauerbier |
| 5,183,438 A * | 2/1993 | Blom ........................ B32B 5/18 |
| | | 472/92 |
| 5,213,547 A | 5/1993 | Lochtefeld |
| 5,219,315 A | 6/1993 | Fuller |
| 5,236,280 A | 8/1993 | Lochtefeld |
| 5,236,404 A | 8/1993 | Maclennan |
| RE34,407 E | 10/1993 | Frenzl |
| 5,267,812 A | 12/1993 | Suzuki |
| 5,271,692 A | 12/1993 | Lochtefeld |
| 5,285,536 A | 2/1994 | Long |
| 5,314,383 A | 5/1994 | Fabbi |
| 5,342,145 A | 8/1994 | Cohen |
| 5,370,591 A | 12/1994 | Jewell |
| 5,378,197 A | 1/1995 | Briggs |
| 5,384,019 A | 1/1995 | Keating |
| 5,385,518 A | 1/1995 | Turner |
| 5,387,159 A | 2/1995 | Hilgert |
| 5,393,170 A | 2/1995 | Lochtefeld |
| 5,401,117 A | 3/1995 | Lochtefeld |
| 5,421,782 A | 6/1995 | Lochtefeld |
| 5,427,574 A | 6/1995 | Donnelly-Weide |
| 5,447,636 A * | 9/1995 | Banerjee ............... H01M 8/1023 |
| | | 156/308.6 |
| 5,453,054 A | 9/1995 | Langford |
| 5,503,597 A | 4/1996 | Lochtefeld |
| 5,524,310 A | 6/1996 | Farnen |
| 5,540,622 A | 7/1996 | Gold |
| 5,564,859 A | 10/1996 | Lochtefeld |
| 5,621,925 A | 4/1997 | Bastenhof |
| 5,628,584 A | 5/1997 | Lochtefeld |
| 5,638,556 A | 6/1997 | Kipers |
| 5,667,445 A | 9/1997 | Lochtefeld |
| 5,676,601 A | 10/1997 | Saunders |
| 5,738,590 A | 4/1998 | Lochtefeld |
| 5,779,553 A | 7/1998 | Langford |
| 5,827,608 A | 10/1998 | Rinehart et al. |
| 5,899,633 A | 5/1999 | Lochtefeld |
| 5,899,634 A | 5/1999 | Lochtefeld |
| 5,937,586 A | 8/1999 | Scherba |
| 6,019,547 A | 2/2000 | Hill |
| 6,047,657 A | 4/2000 | Cox |
| 6,112,489 A | 9/2000 | Zweig |

(56) References Cited

U.S. PATENT DOCUMENTS

| | | | | |
|---|---|---|---|---|
| 6,132,317 | A * | 10/2000 | Lochtefeld | A63B 69/0093 472/117 |
| 6,312,341 | B1 | 11/2001 | Healy | |
| 6,319,137 | B1 | 11/2001 | Lochtefeld | |
| 6,336,771 | B1 | 1/2002 | Hill | |
| 6,345,791 | B1 | 2/2002 | McClure | |
| 6,363,677 | B1 | 4/2002 | Chen | |
| 6,375,578 | B1 | 4/2002 | Briggs | |
| 6,405,387 | B1 | 6/2002 | Barnes | |
| 6,454,659 | B1 | 9/2002 | Noble | |
| 6,491,589 | B1 * | 12/2002 | Lochtefeld | A63C 19/00 239/288 |
| 6,527,646 | B1 | 3/2003 | Briggs | |
| 6,558,264 | B2 | 5/2003 | Gordon | |
| 6,562,771 | B2 | 5/2003 | Finch | |
| 6,616,542 | B1 | 9/2003 | Reddick | |
| 6,676,530 | B2 * | 1/2004 | Lochtefeld | A63B 69/0093 472/117 |
| 6,716,107 | B2 | 4/2004 | Lochtefeld | |
| 6,726,403 | B1 | 4/2004 | Kriticos | |
| 6,758,231 | B1 | 7/2004 | Lochtefeld | |
| 6,796,096 | B1 | 9/2004 | Heath | |
| 6,920,651 | B2 | 7/2005 | Roberts | |
| 7,073,977 | B2 | 7/2006 | Unterweger | |
| 7,224,252 | B2 | 5/2007 | Meadow | |
| 7,285,053 | B2 | 10/2007 | Henry | |
| 7,513,504 | B2 | 4/2009 | Lochtefeld | |
| 7,547,255 | B2 * | 6/2009 | Lochtefeld | A63B 69/0093 428/92 |
| 7,607,271 | B2 | 10/2009 | Griffin | |
| 7,666,104 | B2 | 2/2010 | Lochtefeld | |
| 7,717,645 | B2 | 5/2010 | McLaughlin | |
| 7,718,246 | B2 | 5/2010 | Strauss | |
| 7,775,895 | B2 | 8/2010 | Henry | |
| 7,789,804 | B1 | 9/2010 | Phillips | |
| 7,951,011 | B2 | 5/2011 | Lochtefeld | |
| 7,958,669 | B2 | 6/2011 | Casimaty | |
| 8,042,200 | B2 | 10/2011 | Webber | |
| 8,056,295 | B2 | 11/2011 | Cappelle | |
| 8,088,016 | B2 | 1/2012 | Murphy | |
| 8,167,134 | B2 * | 5/2012 | Helmy | B07B 1/4618 209/400 |
| 8,290,636 | B2 | 10/2012 | Manning | |
| 8,550,926 | B2 * | 10/2013 | Lochtefeld | A63G 21/18 472/117 |
| 8,641,543 | B2 * | 2/2014 | Lochtefeld | A63B 71/0036 472/117 |
| 8,771,093 | B2 | 7/2014 | Bowen | |
| 8,784,224 | B1 | 7/2014 | Schafer | |
| 8,882,604 | B2 | 11/2014 | Lochtefeld | |
| 8,967,388 | B1 * | 3/2015 | Parsons | B07B 1/4654 209/393 |
| 9,072,927 | B2 | 7/2015 | Sammann | |
| 9,194,146 | B2 | 11/2015 | Murphy | |
| 9,254,428 | B2 | 2/2016 | Kriticos | |
| 9,463,390 | B2 | 10/2016 | Vicente | |
| 9,550,127 | B2 | 1/2017 | Lochtefeld | |
| 9,586,159 | B2 | 3/2017 | Coleman | |
| 9,756,658 | B2 | 9/2017 | Murphy | |
| 9,878,255 | B2 | 1/2018 | Kriticos | |
| 10,195,535 | B2 | 2/2019 | Koide | |
| 10,335,694 | B2 | 7/2019 | Koide | |
| 10,376,799 | B2 | 8/2019 | Vicente | |
| 10,525,362 | B2 | 1/2020 | Vicente | |
| 2003/0004003 | A1 * | 1/2003 | Lochtefeld | A63B 69/0093 472/117 |
| 2003/0029109 | A1 | 2/2003 | Hellberg | |
| 2003/0153221 | A1 | 8/2003 | Weir | |
| 2004/0216226 | A1 | 11/2004 | Demarteau | |
| 2007/0167246 | A1 | 7/2007 | McKee | |
| 2008/0060123 | A1 | 3/2008 | Lochtefeld | |
| 2008/0216427 | A1 * | 9/2008 | Lochtefeld | A63G 21/18 52/309.9 |
| 2008/0286048 | A1 | 11/2008 | Camahan | |
| 2008/0293505 | A1 | 11/2008 | Northam | |
| 2009/0029785 | A1 | 1/2009 | McKee | |
| 2009/0137330 | A1 | 5/2009 | Sefchick | |
| 2009/0169305 | A1 | 7/2009 | Lochtefeld | |
| 2011/0314589 | A1 | 12/2011 | Vito et al. | |
| 2012/0037198 | A1 | 2/2012 | Cantin | |
| 2013/0074254 | A1 | 3/2013 | Payne et al. | |
| 2014/0357387 | A1 | 12/2014 | Murphy | |
| 2015/0057093 | A1 | 2/2015 | Murphy | |
| 2015/0065261 | A1 | 3/2015 | Lochtefeld | |
| 2016/0076267 | A1 | 3/2016 | Murphy | |
| 2017/0136373 | A1 | 5/2017 | Vicente | |

FOREIGN PATENT DOCUMENTS

| | | |
|---|---|---|
| CH | 176562 | 4/1935 |
| DE | 159793 | 8/1903 |
| DE | 271412 | 11/1912 |
| DE | 373684 | 4/1932 |
| DE | 1210155 | 2/1966 |
| DE | 2222594 | 11/1973 |
| DE | 2714223 | 10/1978 |
| DE | 3445976 | 12/1984 |
| EP | 96216 | 12/1983 |
| FR | 1019527 | 1/1953 |
| FR | 1300144 | 8/1962 |
| FR | 2219504 | 9/1974 |
| FR | 271977 | 7/1992 |
| FR | 2671977 | 7/1992 |
| GB | 375684 | 6/1932 |
| GB | 1090262 | 11/1967 |
| GB | 1118083 | 6/1968 |
| GB | 1204629 | 9/1970 |
| GB | 2223414 | 4/1990 |
| JP | 52-41392 | 3/1977 |
| JP | H03258280 | 11/1991 |
| NO | 310138 | 12/1992 |
| SU | 682238 | 8/1979 |
| SU | 953075 | 8/1982 |
| WO | 1983/004375 | 12/1983 |
| WO | 2000/005464 | 2/2000 |
| WO | 2000/064549 | 11/2000 |
| WO | 2002/058810 | 8/2002 |
| WO | 2014/153456 | 9/2014 |

\* cited by examiner

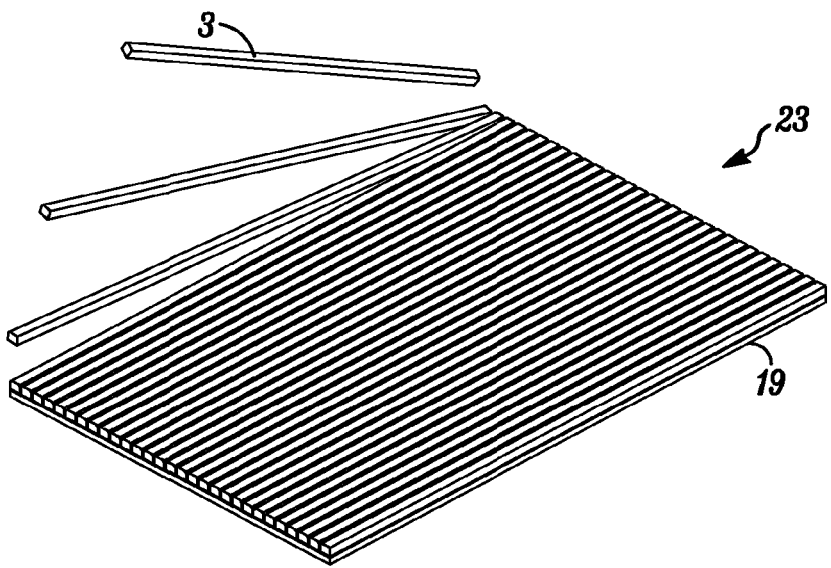
FIG. 9
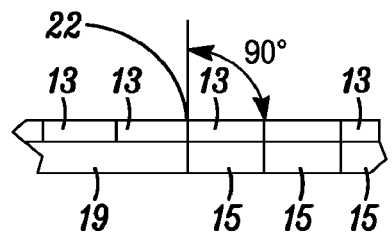
FIG. 9A
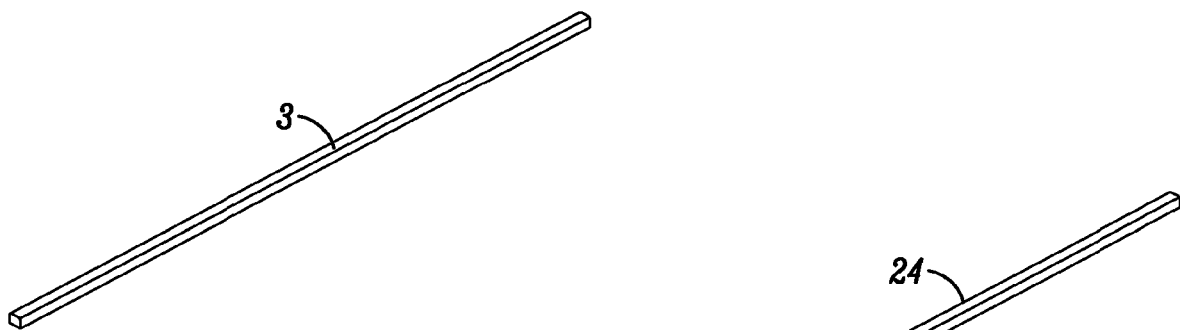
FIG. 10
FIG. 11

PADDED GRATE DRAINAGE SYSTEM FOR WATER RIDES

RELATED APPLICATIONS

This application is a continuation of Nonprovisional patent application Ser. No. 15/413,245, filed on Jan. 23, 2017, which is a continuation of Nonprovisional patent application Ser. No. 14/220,577, now U.S. Pat. No. 9,550,127, filed on Mar. 20, 2014, which claims the benefit of U.S. Provisional Application No. 61/804,038, filed Mar. 21, 2013, each of which are incorporated herein by reference.

BACKGROUND

Water ride attractions have become popular in water theme parks and other entertainment facilities throughout the country. Some of these water ride attractions comprise a ride surface having a sheet flow of water thereon designed to allow participants to ride on the flowing body of water, and therefore, for the safety of the participants, they require the ride surface to be provided with adequate surface padding. And to enable the water flowing on the ride surface to be easily propelled thereon, such as from front to the back, and easily drained therefrom, such as along the back, it is desirable for the ride surface to have a means for draining water from the ride surface. This not only helps facilitate the development of the proper sheet flow and clearance of water from the ride surface, but it also helps enable the participants riding on the ride surface to properly enter and safely exit from the ride surface when needed.

For this purpose, many such water ride attractions have previously incorporated the use of conventional industrial grating or a combination of industrial grating with a layer of PVC matting attached thereon with open spaces between them to allow water to drain through, such as into a storage tank below. An example of this type of drainage system is one that has been used in connection with Applicant's previous water ride attraction known as the FlowRider®. The FlowRider® is essentially a stationary wave generating machine that has a resilient inclined ride surface on which a sheet flow of water is propelled relatively upward thereon. The rider who participates is able to use the upward force of the flowing body of water, on one hand, along with the downward force of gravity, on the other hand, to reach an equilibrium point, wherein it is desirable for the participants to be able to safely enter onto the ride surface and exit therefrom, such as near the front or back, respectively. Accordingly, it was desirable to furnish a floor support system that helps not only support the flowing body of water on the ride surface, but also allows the flowing body of water to be drained from the ride surface and into the storage tank below.

It should be noted that a drainage system near the front close to where the nozzles that propel the water onto the ride surface are located is desired so that water does not buildup as it is being injected onto the ride surface. The front drainage system preferably safely supports the participants as they enter onto the water ride from, the front. Likewise, it is desirable to have a drainage system, near or along the back, to support any participant that may fall and be swept toward the back, and to allow water flowing on the ride surface to be drained into a tank and recirculated back toward the front nozzles.

One problem with the above mentioned drainage system is that when the grating with the matting thereon continued to be unevenly loaded during operation, the matting tended to tear or loosen from the grating, and these tears would either take place along the seams due to weak weld joints or along the upper and lower layers where the matting would eventually come apart. And unfortunately, when these problems occurred, the grating was not reparable and therefore the attraction became unsafe to operate as well as costly and time consuming to replace.

An additional problem with the previous design is that the matting required a pre-determined mold to be used, which ended up limiting the size (width and length) that the matting could come in, which can foe a. problem especially because the production is often outsourced to outside fabricators. This often resulted in having to put together a patch-work of pieces and associated seams where multiple pieces of matting had to be joined together, which resulted in weak joints containing discontinuities and potential scratch hazards, such as in the event a participant slides over the joint, etc.

Because of these problems, a need has arisen to develop an improved drainage system design for water rides such as the FlowRider®.

SUMMARY

The current invention represents an improvement over prior water ride drainage systems in the manner in which it is formed, constructed and installed, and helps to avoid the problems mentioned above.

The present system preferably comprises sheets of composite members that are secured together with at least two support bars to form a monolithic sheet of composite members that can be used as a drainage system for water rides such as the FlowRider®. In particular, each composite member is formed using multiple rigid bars (such as made of fiberglass or stainless steel, etc.) adhered to a layer of foam padding on one side thereof (such, as with urethane adhesive, etc.), wherein each composite member is encapsulated in a PVC or plastic shrink wrap material (such as a tube or sleeve) that helps to make each water impervious. The completed composite members are secured with screws to the support bars (such as made of stainless steel, etc.) to help form a single monolithic sheet of composite members, wherein the composite members are extended substantially parallel to each other and spaced a predetermined distance apart from, each other and are cut to a predetermined length and size. The ends of the composite members are preferably sealed with a sealant, like rubber, to prevent water penetration, etc.

Each sheet of composite members is preferably anywhere from eight to twelve feet in length, although any length or width is possible. The preferred sheets can be prefabricated to the appropriate length and width, or custom, cut on site, which makes them easy to adapt and fit into the desired shape, such as in any existing or new water ride, etc. On site, the sheets of composite members are preferably used modularity and positioned and secured to the water ride surface with the padded side facing up and the rigid side facing down, wherein the composite members are preferably fastened to additional support members located on the ride surface using screws and connected into place. The encapsulated composite members are preferably relatively narrow in width, such as anywhere from 10.0 mm to 100.0 mm in width, but sufficiently thick enough to support the weight of the water and participant riding on the water ride. The composite members are preferably spaced, apart with a gap of no more than about 8.0 mm between them, which helps to prevent fingers and toes from getting caught, while at the same time, allowing water to drain through. The support bars are preferably placed center to center (such as 24" apart) to prevent the composite members from deflecting and the gaps from widening during operation. The composite member ends are preferably covered with a liquid sealant, or capped with a molded shrink cap, as desired.

The encapsulated composite members and sheets of composite members are preferably constructed using the following method:

The first step comprises forming multiple rigid bars such as made of fiberglass or stainless steel that are elongated and have a substantially rectangular cross section and that have a predetermined length.

The second step comprises gluing the rigid bars onto a sheet of foam using an adhesive such as urethane spread over the sheet. The rigid bars are preferably positioned onto the sheet substantially parallel to each other, side by side, with little or no space between them, wherein the adhesive is allowed to dry to bond the rigid bars to the foam.

The third step comprises trimming off any excess foam from the edges of the sheets beyond where the rigid bars are attached.

The fourth step comprises using a sharp blade to cut the sheet of foam in between the rigid bars and separating the rigid bars from the sheet and each other to form the composite members. Each composite member then formed comprises a rigid bar on one side and a layer of foam adhered thereto on the other side.

The fifth step comprises sliding each composite member into a water impervious tube or sleeve such as made of plastic or PVC.

The sixth step comprises passing the composite member with the tube or sleeve around it through an oven or other heated space to melt or otherwise shrink wrap the tube or sleeve around the composite member to effectively seal the PVC or plastic around them.

The seventh step comprises securing the encapsulated composite members to at least two support bars to create a monolithic sheet of composite members using screws that extend from the support bars and into the composite members. Preferably, a jig with spaces is used to help line up the composite members such that they are spaced with a predetermined distance between them and extended substantially parallel to each other.

The eighth step comprises cutting or trimming the ends of each composite member to remove any excess PVC or plastic material and to form the monolithic sheets having a predetermined size and length.

The ninth step comprises turning the completed sheets of composite members on their ends, i.e., vertically, and dipping the ends into a liquid sealant to seal the ends thereof. Alternatively, molded caps can be provided and secured to the ends to seal the ends thereof.

Other aspects of the invention will become evident from reviewing this specification and the associated drawings.

BRIEF DESCRIPTION OF THE DRAWINGS

FIG. 9 shows tire next step where the sheet of foam is being cut in between each composite member shown in FIG. 1 and each composite member is removed from the sheet of foam;

FIG. 9A shows that it is important to make the cuts specified above in connection with FIG. 9 at right angles relative to the sheet of foam as well as that the rigid bars are placed adjacent to each other with very little or no space between them, which avoids wasting foam and having to trim excess foam from each one;

FIG. 10 shows the composite member with the rigid bar on one side and the layer of foam padding on the other;

FIG. 11 shows the next step of sliding the composite member into a tube or sleeve made of plastic or PVC;

DETAILED DESCRIPTION

Figure 1:
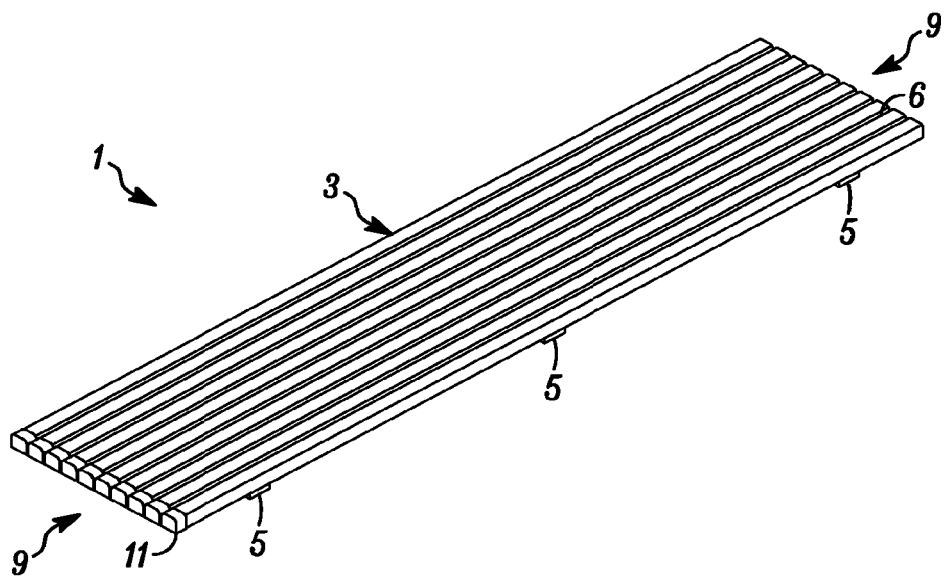
FIG. 1 is a perspective view of a single monolithic sheet of composite members made according to the present invention.
Figure 2:
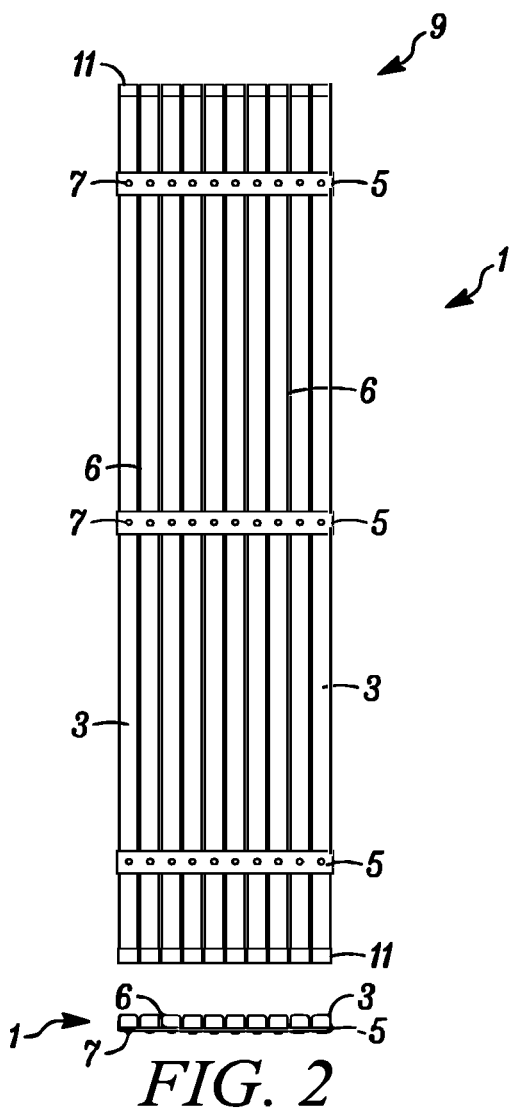
FIG. 2 is a bottom view of the monolithic sheet of composite members shown in FIG. 1, along with an end view at the bottom.

FIG. 1 shows a single monolithic sheet 1 of encapsulated composite members 3 made according to the present invention wherein multiple encapsulated composite members 3 are positioned side by side, substantially parallel to each other, with a slight gap 6 in between each one, wherein the gap 6 is preferably no more than about 8.0 mm in width, which is small enough to prevent fingers and toes from getting caught in between them, while at the same time, large enough to allow water to pass through. As shown in FIG. 2, multiple support bars or battens 5, such as made of stainless steel, are preferably extended across the bottom side perpendicular to the longitudinal direction of composite members 3 and used to secure composite members 3 to create monolithic sheet 1. Preferably, stainless steel screws 7 are used and extended through support bars or battens 5 and into composite members 3 to secure them together, although any suitable connection can be used. The number and spacing of the support bars or battens 5 can vary depending on the length of the composite members 3 and the size of the overall monolithic sheet 1. Each monolithic sheet 1 is preferably anywhere from one meter to six meters in length, although virtually any size is possible, wherein the width and length can vary depending on the size of the drainage area and ride surface that is being installed. The width also varies depending on the number of composite members 3 that are used in each sheet 1.

Figure 25:
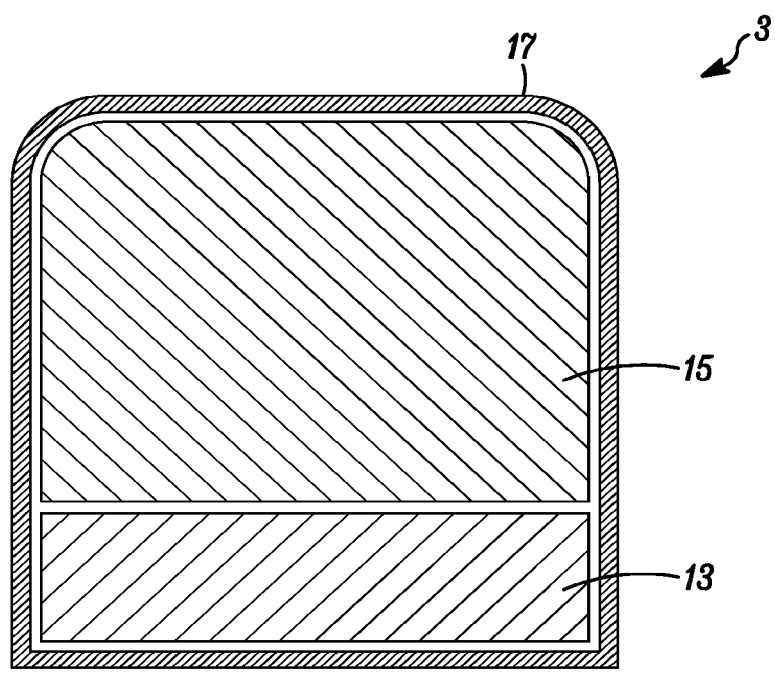
FIG. 25 is a cross section view of a typical single composite member with its rigid side facing down and the padded side facing up, with the tube or sleeve of PVC or plastic surrounding it after it has been shrink wrapped.

Preferably, each composite member 3 is constructed as follows:

First, to provide rigidity and support, composite member 3 preferably comprises a substantially elongated rigid bar 13, such as made of fiberglass or stainless steel or other strong material, that is formed with a rectangular cross section, such as shown in FIG. 25, and extended into strips or bars having a predetermined elongated length. These bars 13 are preferably relatively flat and narrow but also have sufficient width and thickness to provide adequate moment resistance to support the weight of participants who may traverse on the ride surface. Generally speaking, the width of each rigid bar 13 is preferably in the range of from 10.0 mm to 100.0 mm, wherein the width of each one is preferably greater than its depth. The depth is preferably thick enough to provide adequate moment resistance, which is dependent on the spacing of the supports and the distance that the supports span.

Second, to provide adequate padding and cushioning on the ride surface, composite members 3 preferably comprise a layer of foam 15 adhered thereto, such as made of closed cell urethane, which is adhered to rigid bar 13 with an adhesive, such as urethane or other glue. As can be seen in FIG. 25, foam layer 15 is preferably adhered, to rigid bar 13 and has a sufficient depth or thickness to provide padding and cushioning support for participants who may traverse on the water ride, which helps to reduce injuries, etc. The depth of foam layer 15 can be anywhere from one to three times the depth of rigid bar 13, although the ratio is preferably above two. Foam layer 15 is preferably substantially rectangular in cross section and the side facing rigid bar 13 is preferably substantially flat to provide adequate adherence to rigid bar 13. The combination of rigid bar 13 and foam layer 15 comprise composite member 3.

Figure 24:
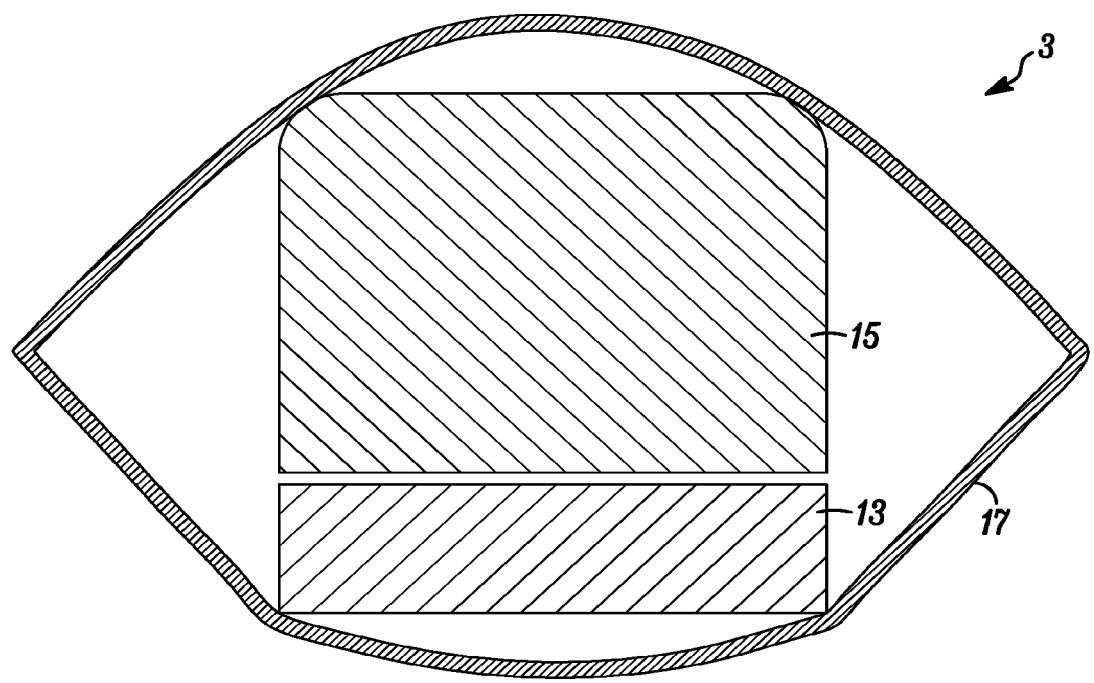
FIG. 24 is a cross section view of a typical single composite member with its rigid side facing down and the padded side facing up, with the tube or sleeve of PVC or plastic surrounding it, before, it has been shrink wrapped.

Third, encapsulating the composite member 3 is preferably an outer layer of water impervious material 17, such as PVC or plastic, etc., which, has been heated and shrink wrapped around composite member 3. In this respect, FIG. 24 shows what outer layer 17 looks like before it has been shrink wrapped, and FIG. 25 show's outer layer 17 after it has been shrink wrapped. Surrounding composite member 3 with tire outer layer material 17 helps to seal and protect the composite member 3 from water damage which can occur if the outer layer is torn or otherwise damaged.

A unique aspect of the present invention relates to how the encapsulated composite members 3 are formed and how the monolithic sheet 1 is created, which is diagrammatically shown in FIGS. 6 through 21, and explained as follows:

The first step involves the process of creating the composite members 3 which is done by first forming the elongated rigid bars 13 which can be made of fiberglass or stainless steel. These rigid bars 13 are preferably elongated narrow bars having a substantially rectangular cross section and predetermined length to provide an adequate amount of strength and moment resistance which is dependent on the support spacing, etc. The rigid bars 13 are preferably relatively narrow in width, such as anywhere from 10.0 mm to 100.0 mm wide, but sufficiently thick enough to support the weight of the water and participants riding on the water ride.

Figure 6:
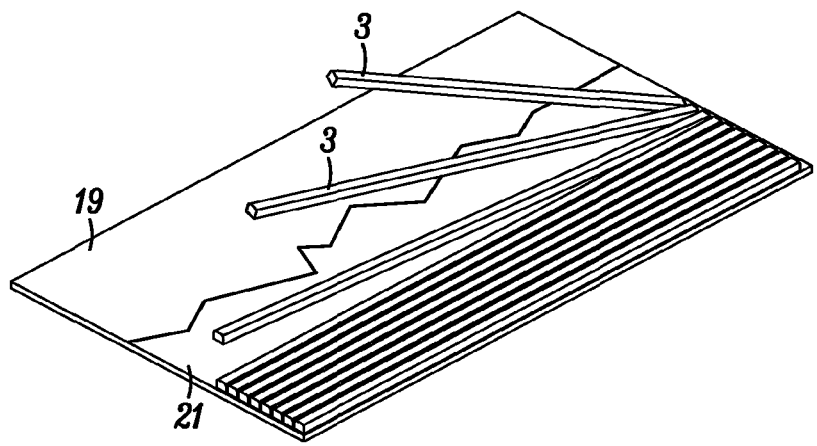
FIG. 6 shows the first step of the method of making the monolithic sheet of composite members, wherein the first step comprises applying an adhesive onto a sheet of foam and adhering multiple rigid bars onto the sheet of foam.
Figure 7:
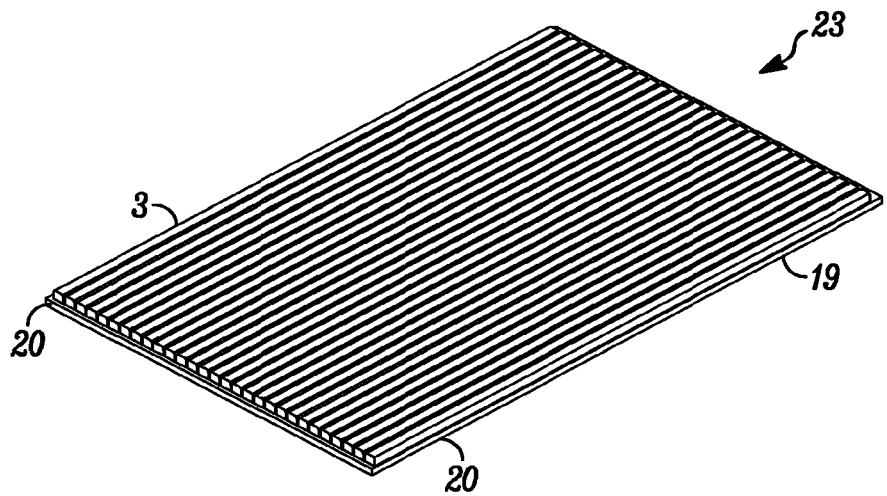
FIG. 7 shows the completed sheet of foam with multiple rigid bars adhered thereto before the ends are cut or trimmed.

The second step comprises gluing the rigid bars 13 onto a sheet of foam 19, as shown in FIG. 6, using an adhesive such as urethane 21 that has been spread across the sheet. Preferably, rigid bars 13 are positioned on the sheet of foam 19 adjacent to each other with little or no space between them, wherein rigid bars 13 are pressed firmly against the adhesive and the adhesive is allowed to dry and harden, until rigid bars 13 are bonded securely to the sheet of foam 19, To ensure full coverage by the foam, sheet 19 is preferably slightly larger than the total length and width of the collective rigid bars 13. A completed sheet of foam 23 with the rigid bars 13 adhered thereto is shown in FIG. 7. Excess foam 20 is shown around the edges.

Figure 8:
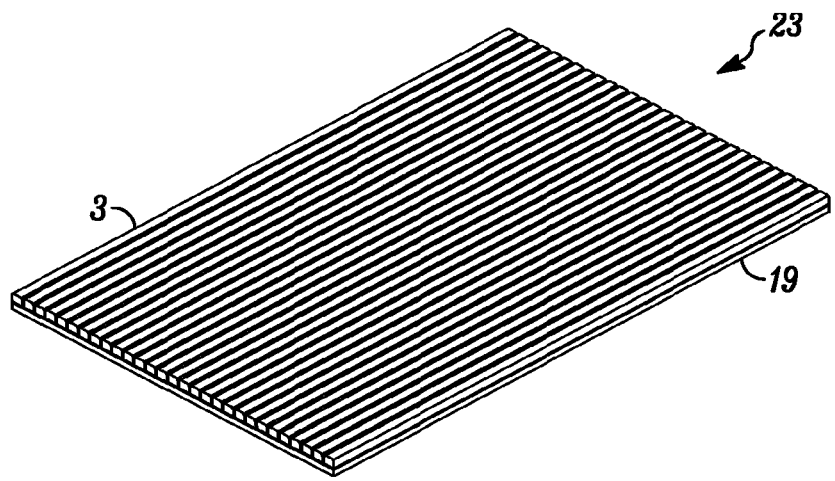
FIG. 8 shows the completed sheet of foam with multiple rigid bars adhered thereto after the ends have been cut or trimmed.

The third step comprises trimming the sheet of foam 19 and cutting off any excess foam 20 from the edges, i.e., anywhere beyond where rigid bars 13 are located. FIG. 8 shows sheet of foam 23 with the rigid bars 13 adhered thereto, but with excess foam 20 removed. Preferably, a sharp blade such as a box cutter or knife is used to neatly cut the foam, by extending it along the edges at a 90 degree angle relative to the longitudinal direction of the rigid bars 13.

The fourth step, as shown in FIG. 9, comprises using a sharp blade to cut the sheet of foam 19 to form composite members 3, This is done by inserting the sharp blade in between the rigid bars 13 and slicing the sheet of foam until each rigid bar 13 is separated from sheet 19 and each other. Once the foam sheet 19 is cut, and composite members 3 are formed, each rigid bar 13 will have a layer of foam 15 adhered thereto on one side, wherein the foam 15 will have substantially the same width and length as rigid bar 13, Again, as shown in FIG. 9A, it is desirable to insert the sharp blade in between the rigid bars 13 such as at a 90 degree angle 22, Once cut, each composite member 3 shall comprise one rigid bar 3 on one side and a layer of foam 15 adhered thereto on the opposite side, A completed composite member 3 is shown in FIG. 10.

Figure 12:
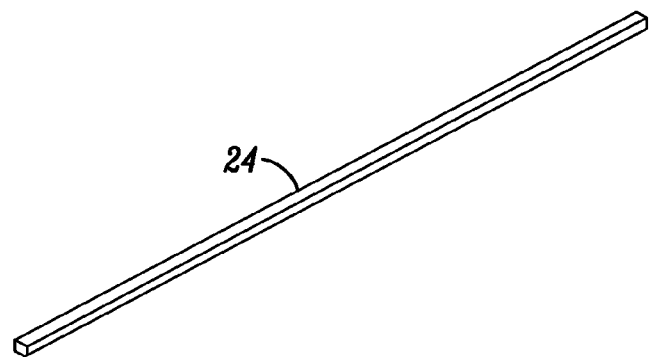
FIG. 12 shows the composite member after it has been inserted into the tube or sleeve of the PVC or plastic.

The fifth step comprises sliding each finished composite member 3, as shown in FIG. 10, into a water impervious tube or sleeve 24 such as made of plastic or PVC. FIG. 11 shows composite member 3 partially covered, and FIG. 12 shows composite member 3 fully covered. At this point, tube or sleeve 24 preferably covers rigid bar 13, but is preferably slightly longer than composite member 3 so that a portion of it extends or hangs from its end to ensure full coverage and encapsulation of composite member 3 and to account for linear shrinkage of tube or sleeve 24, etc.

Figure 13:
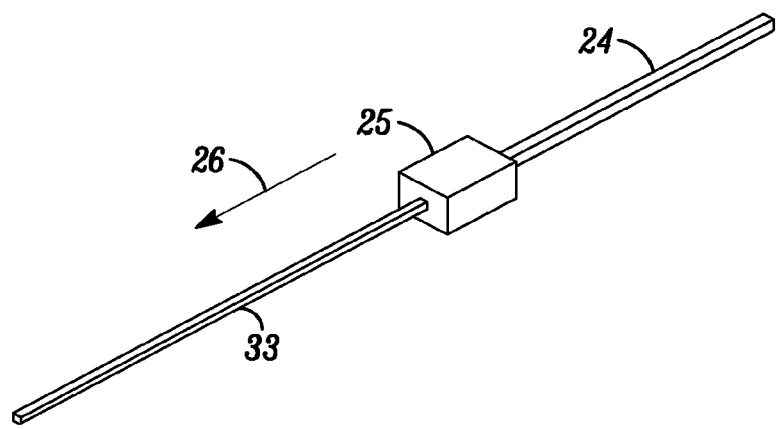
FIG. 13 shows the next step of extending the composite member with the tube or sleeve of PVC or plastic around it through an oven or other heat source to shrink wrap the plastic or PVC around the composite member.
Figure 14:
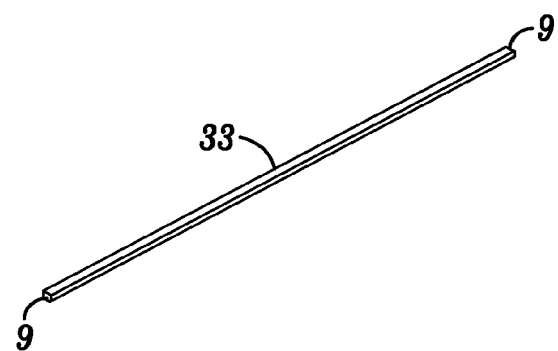
FIG. 14 shows the completed composite member after it has been encapsulated inside the tube or sleeve of PVC or plastic and after the tube or sleeve of PVC or plastic has been heated and shrink wrapped around the composite member.

The sixth step comprises passing the composite member 3 with the tube or sleeve 24 around it through an oven or other heated space 25 (in the direction of arrow 26 as shown in FIG. 13), to melt or otherwise shrink tube or sleeve 24 around composite member 3 to effectively seal composite member 33 and form the encapsulated composite member 33, as shown in FIG. 14. Note that the encapsulated composite member 33 will hereafter be referred to as item number 33 whereas in the previous discussion composite member 3 was referred to as item 3. This is because now composite member 3 has been encapsulated by tube or sleeve 24 to form an encapsulated composite, member 33, although ends 9 have not been trimmed and cut and sealed and excess PVC or plastic is likely to be hanging from each end.

Figure 15:
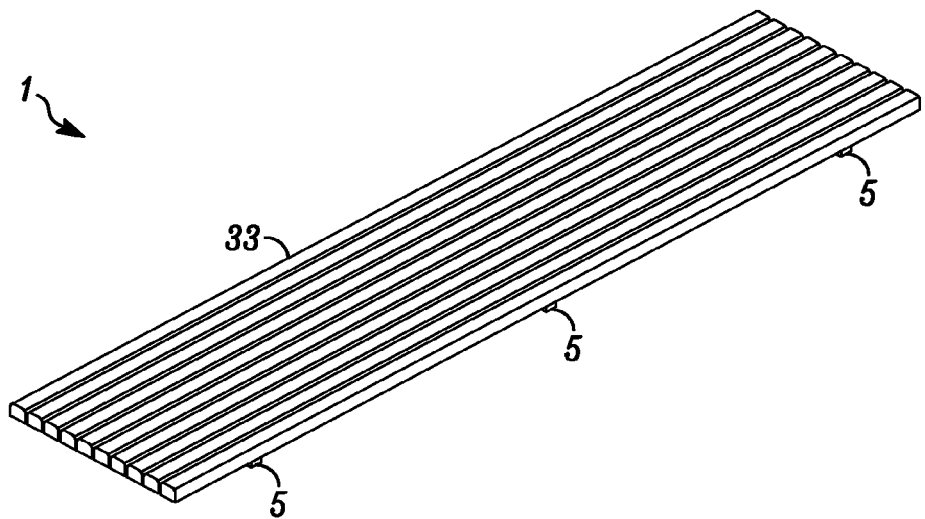
FIG. 15 shows the next step of placing multiple composite members together side by side in a substantially parallel manner using the jig shown in FIG. 15A, wherein predetermined spaces are provided on the jig to enable the composite members to be properly oriented and positioned with a predetermined space between each one.
Figure 15A:
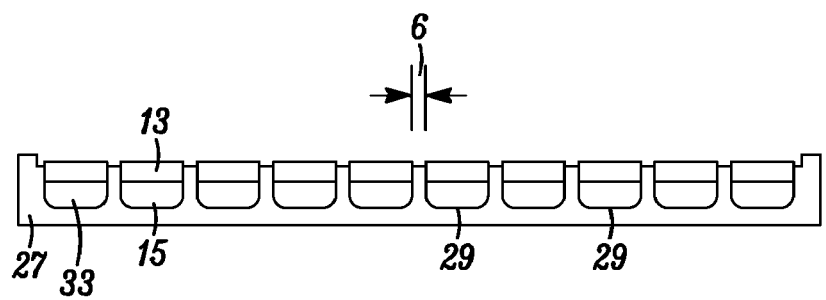
FIG. 15A shows the jig that is used to help orient and position the composite members into sheets, such that they are positioned in a substantially parallel manner with a predetermined space between each one—note that the rigid bar is facing up and the padded surface is facing down while the composite members are positioned on the jig.
Figure 16:
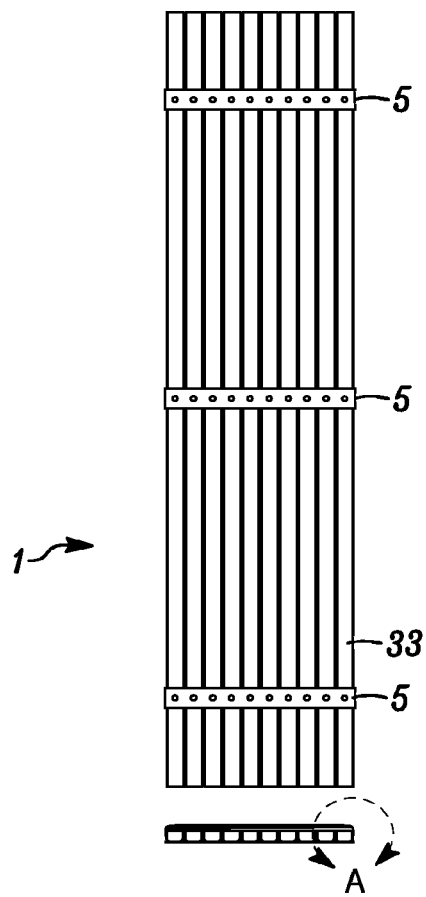
FIG. 16 shows the bottom side of the sheet of composite members with at least two support bars, in this ease three, fastened to the underside of the sheet of composite members, wherein multiple composite members are positioned substantially parallel to each other and secured In place with a predetermined space between each on—an end view of the same sheet is provided at the bottom of this figure.
Figure 16A:
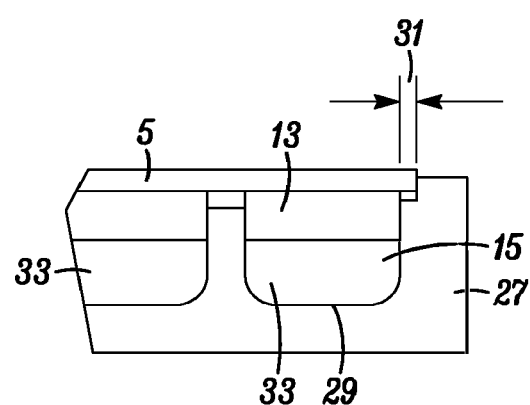
FIG. 16A is a detail view of the area A shown in FIG. 16, showing the jig with the composite members positioned therein, wherein the support bars are positioned thereon.

The seventh step comprises securing the encapsulated composite members 33 to support bars or battens 5, as shown in FIG. 15, to create a single monolithic sheet 1 of encapsulated composite members 33. Three support bars 5 are shown although any number of support bars two and over can be used. The support bars 5 are preferably placed center to center (such as 24" apart from each other) to prevent composite members 33 from deflecting and the gaps from widening during operation. The connection is preferably made using screws 7 that extend through support bars 5 and into the rigid bar side of composite members 33, Preferably, two jigs 27 with spaces 29, such as the one shown in FIG. 16A, are used as a template to help line up, orient and position encapsulated composite members 33 such that they are positioned properly and with the correct spacing, i.e., such that a predetermined gap 6 of about 8.0 mm is provided between each composite member 33 and the composite members 33 are extended substantially parallel to each other. To do this, encapsulated composite members 33 are preferably inserted into spaces 29 on jig 27, wherein the width and center to center spacing of spaces 29 are preferably predetermined based on the final desired spacing of gaps 6 and positioning of composite members 33. Again, gap 6 between composite members 33 is preferably about 8.0 mm, although not necessarily so. FIG. 16 shows a partially completed monolithic sheet 1 of encapsulated composite members 33 with three support bars 5 secured to the underside thereof and FIG. 16 A is a detail view of an end A-A shown in FIG. 16 of two composite members 33 within spaces 29 in jig 27, but with support bar 5 on the top (which is actually the bottom when Installed) of composite members 33.

Figure 3:
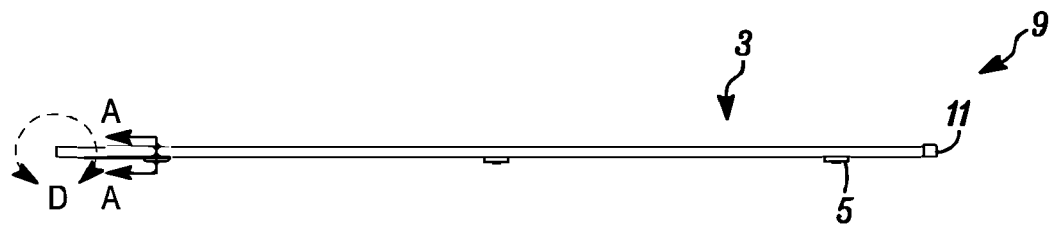
FIG. 3 is an elevation view of the monolithic sheet of composite members shown in FIG. 1.
Figure 4:
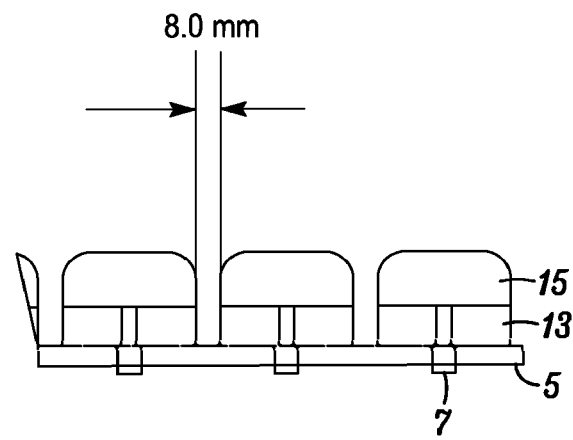
FIG. 4 is a detail section view taken through A-A in FIG. 3.
Figure 5:
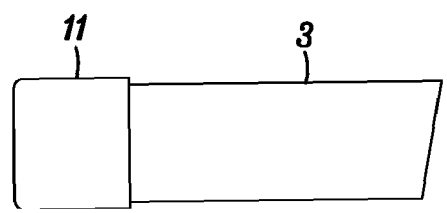
FIG. 5 is a detail of the area D shown in FIG. 3.
Figure 17:
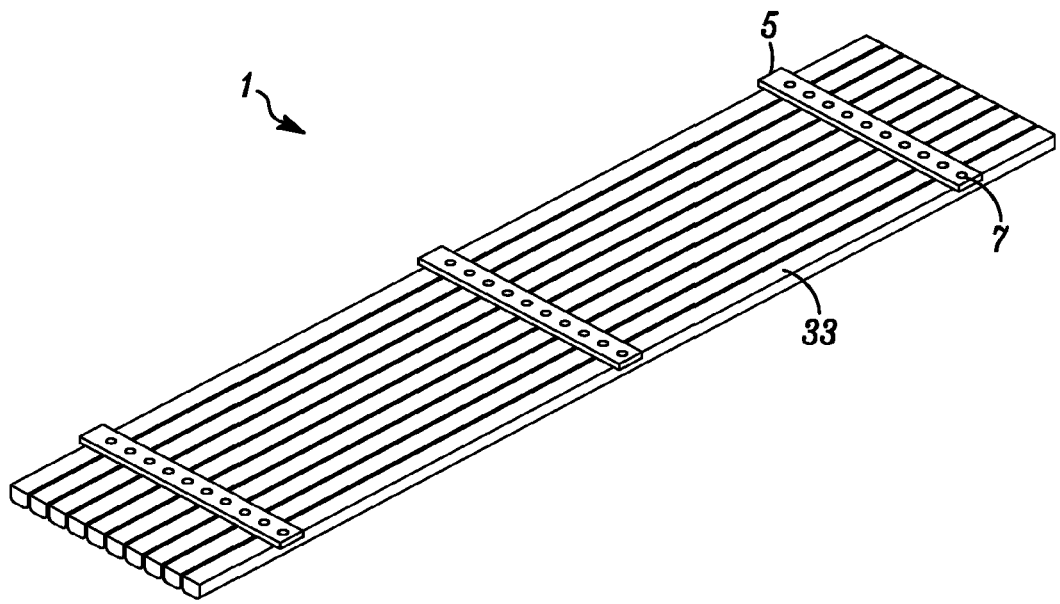
FIG. 17 shows the sheet of composite members upside down with the support bars screwed into the bottom of each composite member to bold and orient the composite members in place.
Figure 18:
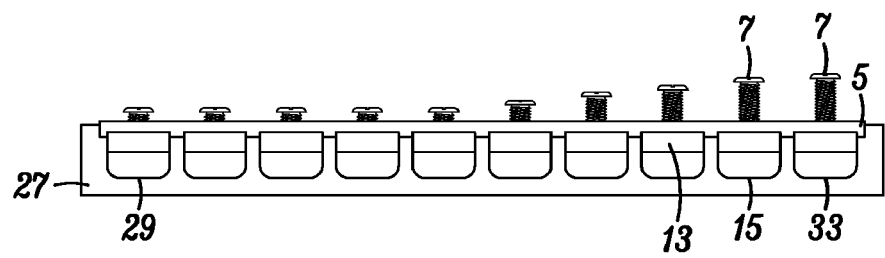
FIG. 18 shows the next step of using screws to fasten the support bars to the bottom of the composite members, with the jig helping to orient and position the composite members substantially parallel to each other, with a predetermined space between each one.

As shown in FIG. 16A, it is important or at least preferred that ends of support bar 5 extend outward a distance 31 from, the last composite member 33, wherein distance 31, as shown in FIG. 16A, is preferably half the distance of gap 6, such that when two sets of monolithic sheets 1 are positioned together, i.e., side by side, the proper full gap 6 can be provided between them. FIG. 17 shows partially completed monolithic sheet 1 lying upside down which allows support bars 5 to be secured perpendicular to the longitudinal direction of the composite members 33 using screws 7. FIG. 18 shows screws 7 being progressively inserted through support bars 5 and into the rigid bar portion of encapsulated composite members 33, Screws 7 are preferably made of stainless steel and are extended through openings or apertures formed in support bars 5, wherein the apertures are preferably slightly larger than the diameter of screws 7. Screws 7 are preferably tightened to compress support bar 5 against composite member 33 to help seal the opening. Note that FIGS. 3 and 4 show how encapsulated composite members 33 are attached to support bar 5 wherein FIG. 4 is a cross section taken along section A-A in FIG. 3 showing screws 7 extended through support bars 5 and into rigid bar 13. Screws 7 are preferably tightened and alternatively provided with a sealant to prevent leakage of water into composite member 33, such as through the openings that have been created by screws 7.

Figure 19:
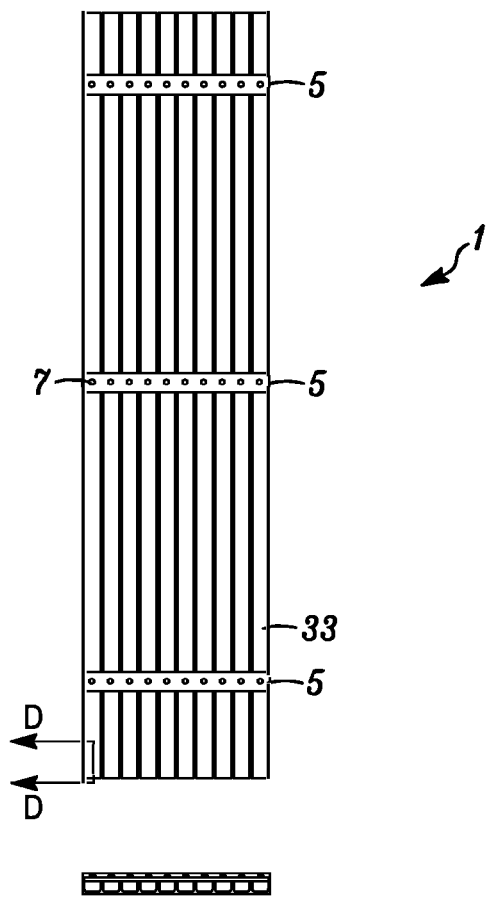
FIG. 19 is a bottom view of the sheet of composite members showing the support, bars secured to the bottom of the composite members.
Figure 19A:
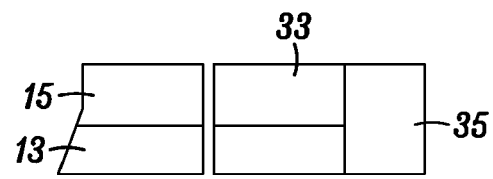
FIG. 19A is a section view taken through area D-D shown in FIG. 19.

The eighth step comprises cutting or trimming each completed encapsulated composite member 33 to a predetermined length, which achieves the purpose of cutting monolithic sheet 1 to its final length as shown in FIGS. 19 and 19A, This can be done by cutting each encapsulated composite member 33 one by one, or by cutting the entire set of composite members 33 collectively such as by using a radial arm saw or cutting press, etc. This is diagrammatically shown in FIG. 19A. This not only cuts composite members 33 and monolithic sheet 1 to the proper length, but also enables any excess PVC or plastic 35 banging from, the ends 9 of each composite member 33 to be removed as well. Note that the cut should be made at a 90 degree angle relative to the monolithic sheet 1 to ensure that each sheet 1 is formed properly. The amount of excess material to be cut should be minimized to minimize waste and cost. Each sheet 1 of composite members 33 can be anywhere from one to six meters in length, and is preferably from eight to twelve feet in length, although any length or width is possible, depending on the size of the application and the distance of the support spacing, etc. They can also be adapted and fit into the desired shape, such as in the shape of a drainage area of any existing or new water ride structure, etc.

Figure 20:
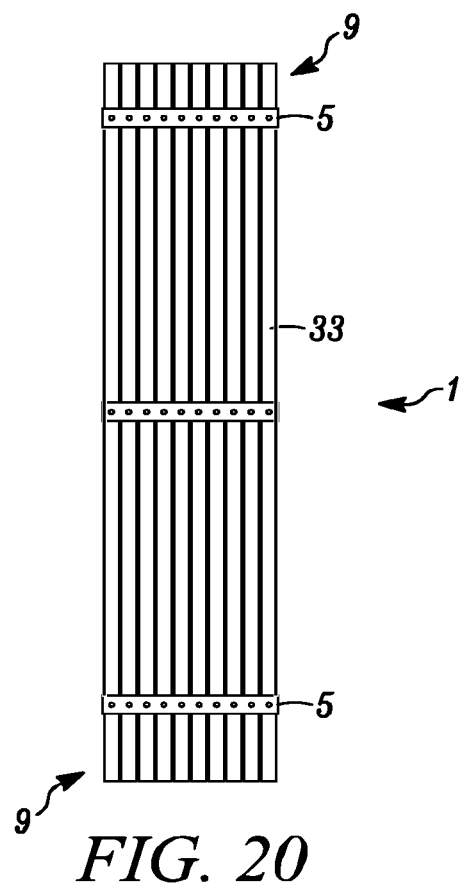
FIG. 20 is a bottom view showing the completed sheet of composite members that has been trimmed or cut to the appropriate length.
Figure 21:
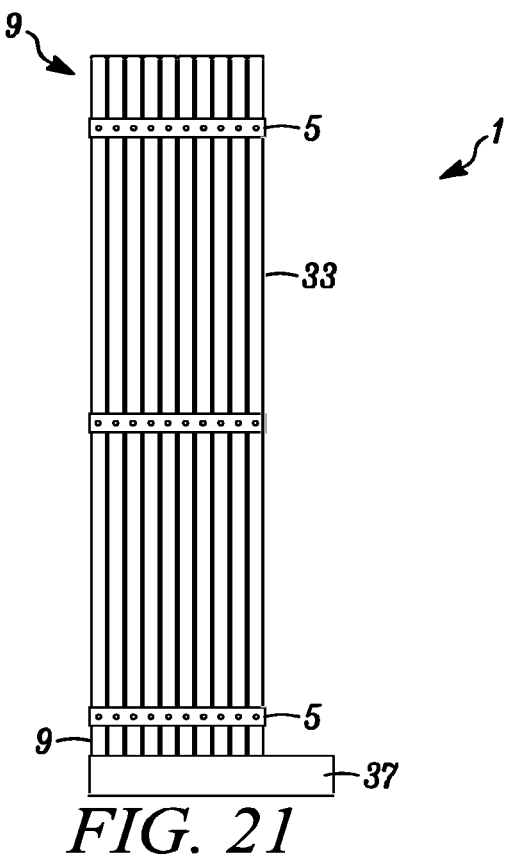
FIG. 21 shows how the completed sheet of composite members can be turned on its end and dipped into a liquid sealant to seal the ends thereof.
Figure 21A:
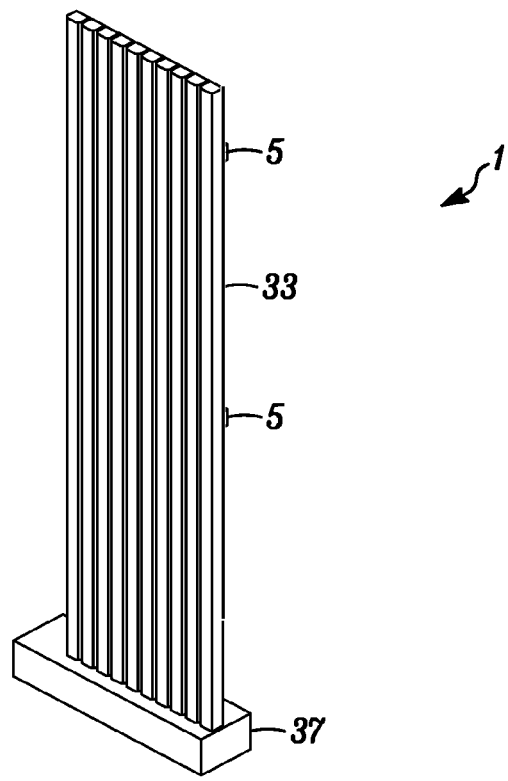
FIG. 21A shows the sheet of composite members standing vertically with the ends of the composite members being dipped into a liquid sealant.

The ninth step comprises taking the monolithic sheet 1, as shown in FIG. 20, and turning it on its end, i.e., vertically, and dipping the ends 9 of each composite member 33 into a liquid sealant (in bath 37), to seal the ends thereof. This is shown in FIGS. 21 and 21A. A possible sealant that can be used is Plasti-dip-F906, Preferably, ends 9 are dipped square to the bath 37 and to a depth of at least 10.00 mm to ensure proper coverage. Alternatively, molded caps 11 can be provided and secured to the ends and heat shrunk to seal the ends thereof.

Figure 22:
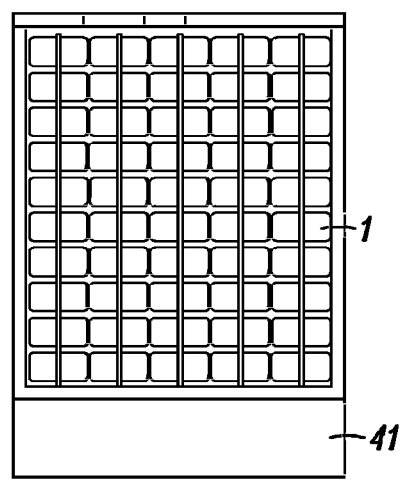
FIG. 22 is an end view showing how the sheets of composite members can be stored in a crate, where the preferred arrangement is for the sheets to be positioned vertically, side by side, so as not to put too much weight or pressure on the padded sides of the composite members.
Figure 23:
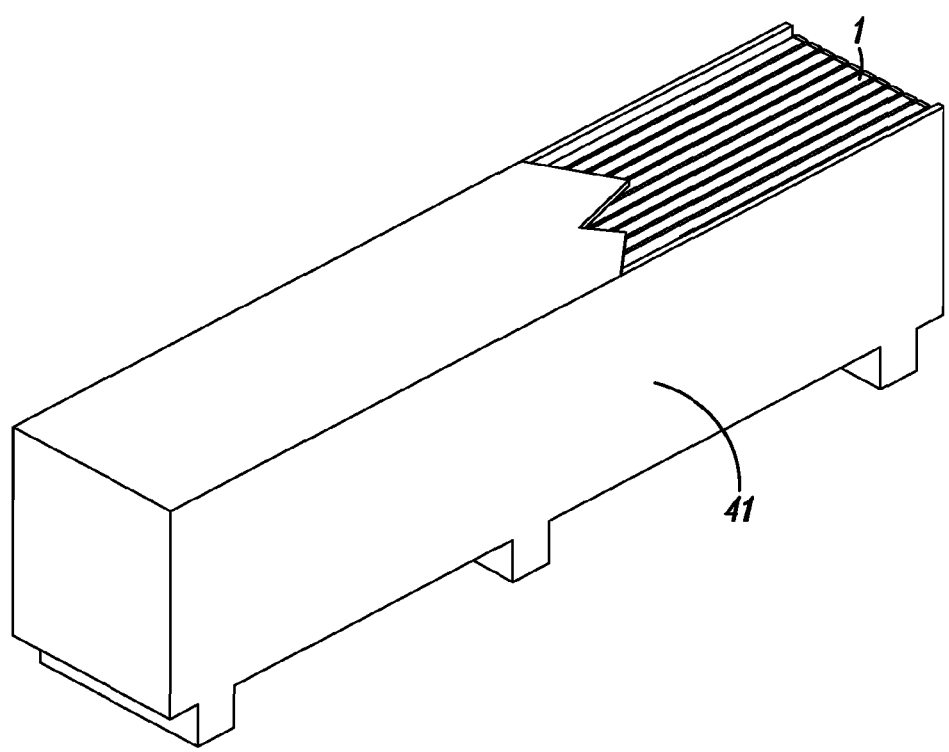
FIG. 23 shows a crate with sheets of composite members positioned substantially vertically inside.

For shipping, multiple completed monolithic sheets 1 are preferably positioned vertically on their sides or ends, and not horizontally on top of each other, as this can cause distortion and possible damage to the foam portion of the composite members 33. FIGS. 22 and 23 show how multiple monolithic sheets 1 can be positioned vertically on their sides in a shipping crate 41.

Figure 27:
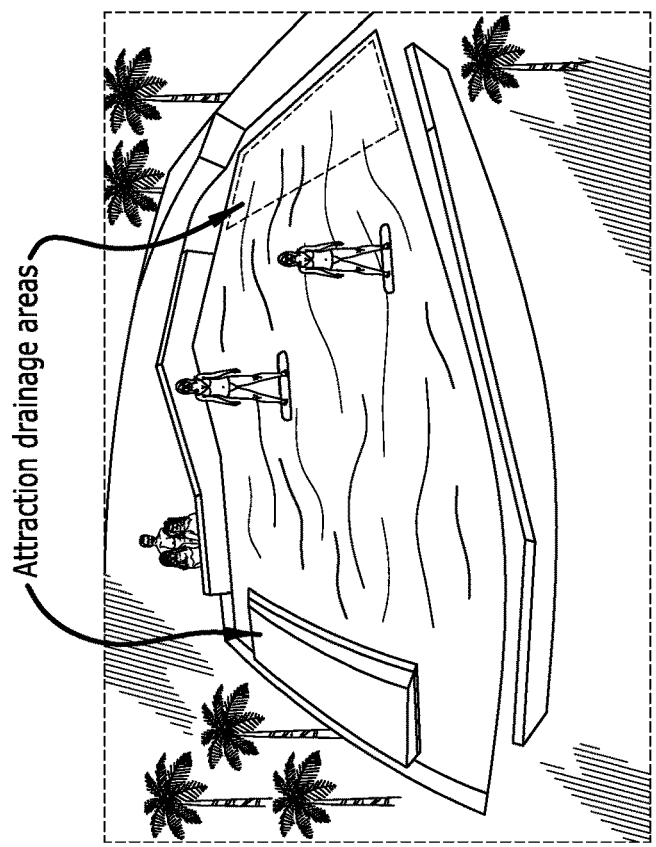
FIG. 27 is a photograph showing a FlowRider® being used with drainage areas on the front and back end of the water ride surface.
Figure 26:
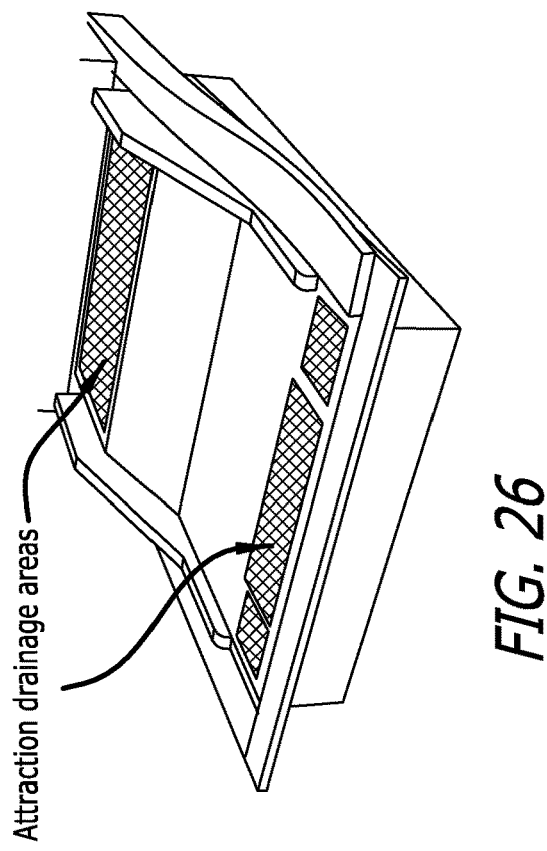
FIG. 26 is a drawing showing a FlowRider® with drainage areas on the front and back end of the water ride surface.

FIGS. 26 and 27 show a water ride attraction such as the FlowRider® which has certain drainage areas on the front and back of the ride surface, which is where the appropriate drainage systems are located. In this respect, each monolithic sheet 1 of composite members 33 can either be prefabricated to fit over and cover the drainage areas, or they can be cut in the field to cover specific areas, in either ease, the sheets can be modularized for easier installation.

What is claimed is:

1. A method of manufacturing a sheet for use in a water ride comprising:
   adhering a first bar to padding to create a first composite member;
   adhering a second bar to a second padding to create a second composite member;
   surrounding at least a portion of each of the composite members with a water resistant sleeve to form multiple encapsulated composite members;
   connecting each of the multiple encapsulated composite members to at least two support bars such that the encapsulated composite members are positioned with a gap between adjacent encapsulated composite members;
   sealing ends of the multiple encapsulated composite members.

2. The method of claim 1, wherein the first padding and the second padding comprising a same sheet of padding.

3. The method of claim 2, wherein the adhering the first bar to padding and adhering the second bar to a second padding comprises covering the same sheet of padding with an adhesive and adhering the first and second bars onto the same sheet of padding in a parallel configuration.

4. The method of claim 3, while adhering the first and second bars on the same sheet of padding are in a parallel configuration.

5. The method of claim 4, further comprising removing excess padding from edges of the same sheet of padding;
   surrounding at least a portion of each of the composite members with a water resistant sleeve to form multiple encapsulated composite members.

6. The method of claim 5, wherein the sleeve is water resistant.

7. The method of claim 6, wherein the surrounding at least a portion of each of the composite members comprises sliding at least a portion of each of the composite members into the sleeve and heating the sleeve to cause the sleeve to shrink around the at least a portion of each of the multiple composite members.

8. The method of claim 1, wherein the sealing the ends of the multiple encapsulated composite members comprises dipping the ends into a liquid sealant.

9. The method of claim 1, wherein the sealing the ends of the multiple encapsulated composite members comprises covering the ends with a molded cap.

10. The method of claim 1, wherein the sheet is positioned on a drainage area of the water ride for allowing draining of water therethrough.

11. A method of manufacturing a water ride comprising:
    providing a ride surface;
    providing nozzles positioned to propel water onto the ride surface;
    providing a drainage system, wherein the drainage system comprises a padded drainage cover created by:
       adhering a first bar to padding to create a first composite member;
       adhering a second bar to a second padding to create a second composite member;
       surrounding at least a portion of each of the composite members with a water resistant sleeve to form multiple encapsulated composite members;
       connecting each of the multiple encapsulated composite members to at least two support bars such that the encapsulated composite members are positioned with a gap between adjacent encapsulated composite members;
       sealing ends of the multiple encapsulated composite members to create a padded drainage cover.

12. The method of claim 11, wherein the first padding and the second padding comprising a same sheet of padding.

13. The method of claim 12, wherein the adhering the first bar to padding and adhering the second bar to a second padding comprises covering the same sheet of padding with an adhesive and adhering the first and second bars onto the same sheet of padding in a parallel configuration.

14. The method of claim 13, while adhering the first and second bars on the same sheet of padding are in a parallel configuration.

15. The method of claim 14, further comprising removing excess padding from edges of the same sheet of padding;
    surrounding at least a portion of each of the composite members with a water resistant sleeve to form multiple encapsulated composite members.

16. The method of claim 15, wherein the sleeve is water resistant.

17. The method of claim 16, wherein the surrounding at least a portion of each of the composite members comprises sliding at least a portion of each of the composite members into the sleeve and heating the sleeve to cause the sleeve to shrink around the at least a portion of each of the multiple composite members.

18. The method of claim 11, wherein the sealing the ends of the multiple encapsulated composite members comprises dipping the ends into a liquid sealant.

19. The method of claim 11, wherein the sealing the ends of the multiple encapsulated composite members comprises covering the ends with a molded cap.

20. The method of claim 11, wherein the sheet is positioned on a drainage area of the water ride for allowing draining of water therethrough.

* * * * *